United States Patent [19]
Boehland, Jr.

[11] 3,788,279
[45] Jan. 29, 1974

[54] FEEDER FOR CLINGING TYPE BIRDS
[75] Inventor: Robert R. Boehland, Jr., Linn, Wis.
[73] Assignee: Feather Hill Industries, Inc., Zenda, Wis.
[22] Filed: July 14, 1972
[21] Appl. No.: 271,924

[52] U.S. Cl. ............................................. 119/52 R
[51] Int. Cl. ......................................... A01k 39/00
[58] Field of Search 119/52 R, 51 R, 23, 53, 52 AF

[56] References Cited
UNITED STATES PATENTS

| | | | |
|---|---|---|---|
| 3,244,150 | 4/1966 | Blair | 119/52 R |
| 3,182,635 | 5/1965 | Waite | 119/51 R |
| 3,547,081 | 12/1970 | Geerlings | 119/52 AF X |
| 2,866,435 | 12/1958 | Blazier | 119/53 |
| 3,316,883 | 5/1967 | Johnson | 119/51 R |
| 2,874,678 | 2/1959 | Bradley | 119/52 R X |
| 1,091,392 | 3/1914 | Schlichtinger | 119/52 R |

Primary Examiner—James H. Czerwonky
Attorney, Agent, or Firm—Wolfe, Hubbard, Leydig, Voit & Osann, Ltd.

[57] ABSTRACT

A bird feeder includes a hollow globe comprising upper and lower hemispherical sections held together by an elongated rod. A funnel mounted within the globe divides the interior into an upper storage area for bird feed and a lower feeding chamber. An orifice forming the lower end of the funnel is located above the bottom of the chamber to direct the flow of feed from the storage area into the chamber. A plurality of ports in the side of the lower hemispherical section communicate with the chamber and include bottom edges which are located in vertical relation to the position of the orifice whereby clinging birds may grasp on the edges and reach the feed within the chamber while other types of birds are discouraged from perching on the feeder and eating feed from the chamber.

7 Claims, 4 Drawing Figures

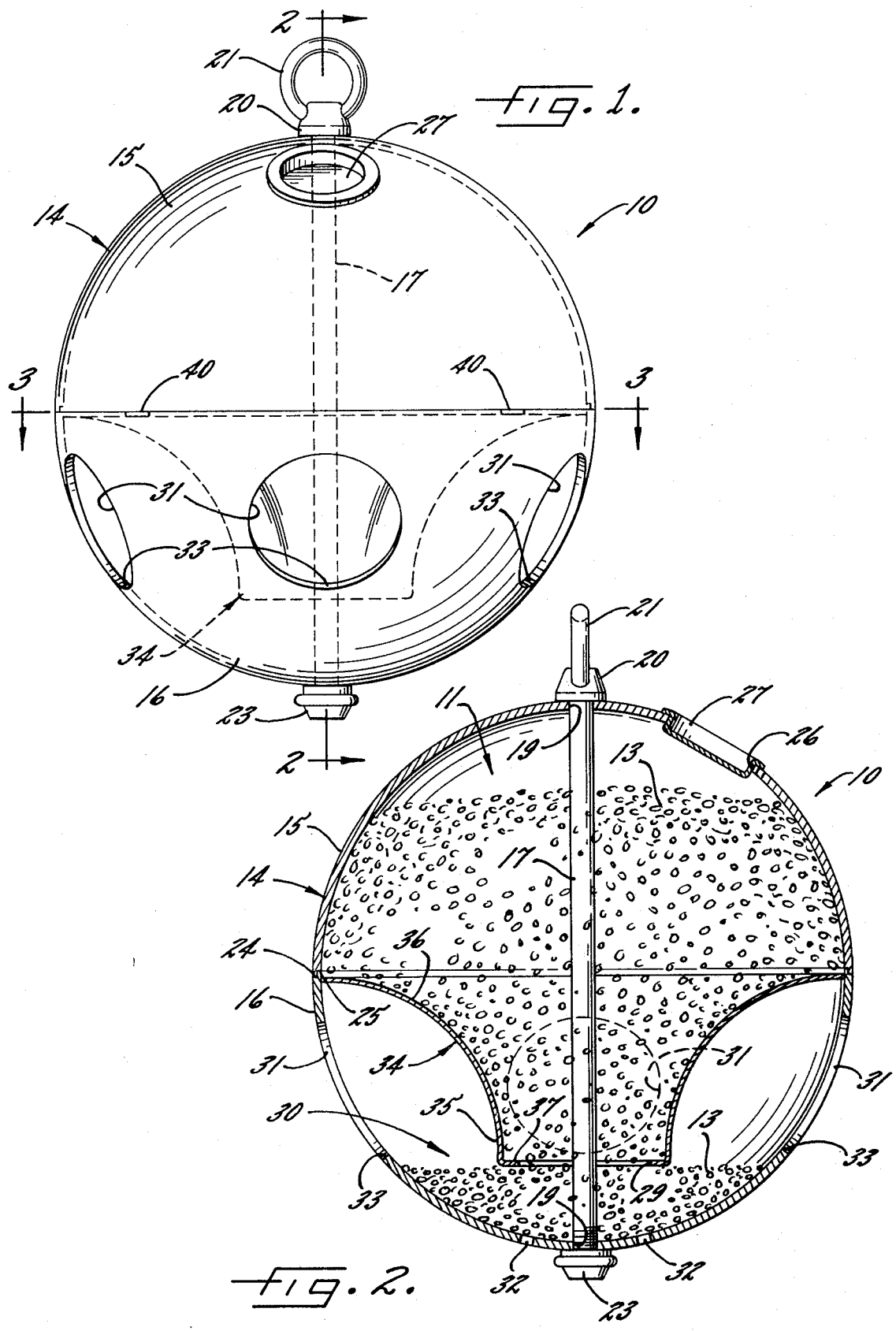

PATENTED JAN 29 1974 3,788,279

FEEDER FOR CLINGING TYPE BIRDS

BACKGROUND OF THE INVENTION

This invention relates generally to a bird feeder and, more particularly, to the type of feeder including a transparent reservoir within which a relatively large quantity of feed is stored and displayed to attract the birds to the feeder. Yet, while a lot of feed is visible, only a limited amount of feed is available for the birds to eat. An example of a feeder of this general type is disclosed in my copending United States application Ser. No. 265,470 filed June 23, 1972 and entitled Bird Feeder.

SUMMARY OF THE INVENTION

The primary object of the present invention is to provide a new and improved bird feeder of the above general character which takes advantage of the natural abilities of clinging birds, such as finches and the like, to limit the type of birds which may eat from the feeder. Accordingly, a more detailed object is to construct the feeder so that the feed to be eaten by the birds is kept within the reservoir requiring the birds to eat from a clinging position outside of the reservoir.

A further object is to provide means for maintaining the feed to be eaten at a predetermined level within the reservoir which enables the birds to reach the feed easily from a clinging position while at the same time the feed is kept from reaching so high a level as to easily spill from the feeder.

The invention also resides in the unique construction of the feeder to require that, for most birds to eat the feed within the reservoir, they must eat from a position clinging to the side of the reservoir and, in addition, the invention resides in the novel relationship between parts of the feeder for maintaining the feed at a constant level within the reservoir and within the reach of birds clinging on the side of the reservoir.

These and other objects and advantages of the present invention will become more apparent from the following detailed description when taken in conjunction with the accompanying drawings.

BRIEF DESCRIPTION OF THE DRAWINGS

FIG. 1 is an elevational view of a bird feeder embodying the novel features of the present invention.

FIG. 2 is a cross-sectional view taken substantially along line 2—2 of FIG. 1.

DETAILED DESCRIPTION OF THE PREFERRED EMBODIMENT

Figure 3:
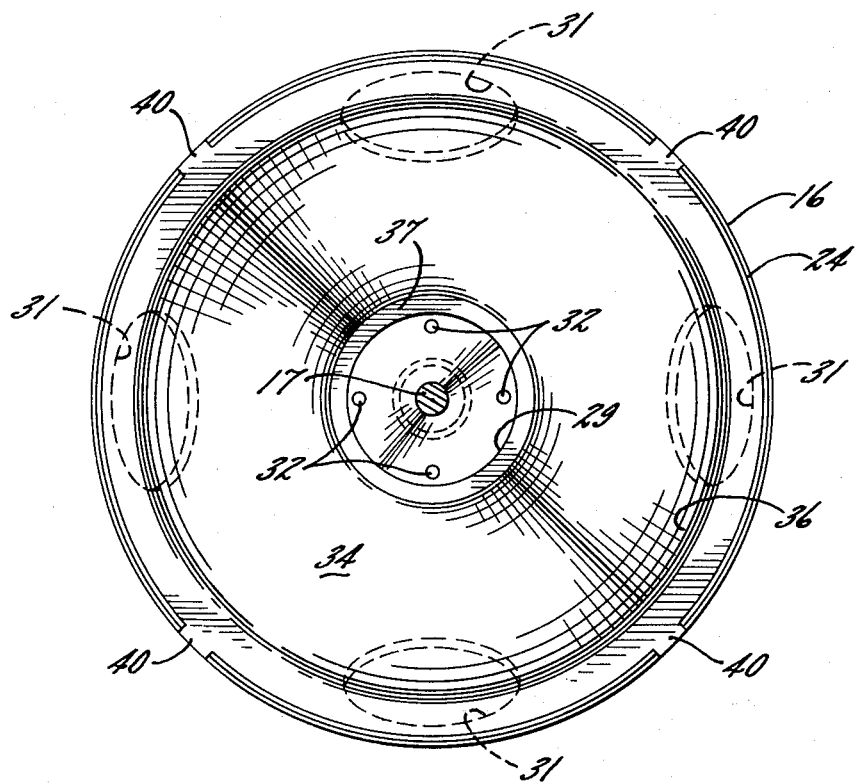
FIG. 3 is a plan view taken substantially along line 3—3 of FIG. 1.

As shown in the drawings for purposes of illustration, the present invention is embodied in a bird feeder 10 which includes a storage area 11 for holding a relatively large supply of feed 13 to replenish feed eaten by birds. In particular, feed is stored within a reservoir 14 formed of clear plastic so that the large supply of feed is visible to the birds to help attract the birds to the feeder. Herein, the reservoir is in the shape of a hollow globe 14, but other shapes may serve equally well for the purposes of this invention.

As shown in FIG. 2, the globe 14 comprises upper and lower hemispherical sections 15 and 16 held together in an abutting edge to edge relationship by an elongated metal rod 17. The latter is telescoped through both the upper and lower sections by way of axial holes 19 in the top of the upper section and the bottom of the lower section. An upper nut 20 with an integral ring 21 for suspending the feeder from a cord (not shown) is threaded upon the exposed upper end of the rod as it protrudes through the upper hole. Similarly, a cap nut 23 is threaded over the lower end portion of the rod whereby the two hemispherical sections are held together with the upper edge 24 of the lower section abutting the lower edge 25 of the upper section (see FIG. 2).

The feed 13 may be added periodically to the globe 14 through an opening 26 in the upper section 15, and a plastic cap 27 covering the opening protects the feed stored within the globe against the elements. Once in the larger storage area 11, the feed flows by gravity through an orifice 29 into a smaller feeding area 30 and holes 32 communicating with the feeding area constitute drains for water which may get into the feeder. As the feed is eaten from the feeding area, new feed from the storage area continually replenishes the feed eaten and thus only a limited but adequate amount of feed need be available at any one time for the birds to eat.

In accordance with the primary aspect of the present invention, the feeder 10 is constructed in a novel manner so to take advantage of the natural abilities of clinging birds to limit the type of birds which may eat from the feeder. For this purpose, the feeding area is enclosed within the reservoir or globe 14 and is defined by a lower chamber 30 for receiving the feed 13 from the upper storage area 11. Means in the lower hemispherical section 16 limit the type of birds which may utilize the feeder and, in particular, this means includes a plurality of ports 31 which allow the clinging type of birds to eat the feed contained by the chamber. By clinging on the edges 33 of the ports, the birds may support themselves on the feeder and reach the feed within the chamber and, to assure that the feed within the chamber is kept at a level within easy reach of the birds, the orifice 29 is formed in a partition 34 separating the storage area 11 and the chamber 30. The vertical position of the orifice within the lower section 16 defines the approximate high level of the feed 13 within the chamber and is located in relation to the bottom edges of the ports so to avoid spillage loss through the ports while at the same time keeping the feed within easy reach of the birds.

In the present instance, the partition 34 between the two hemispherical sections 15 and 16 is a funnel whose lower end portion 35 is formed with the orifice 29. More particularly, the funnel is made of a clear plastic in an inverted frustoconical shape. The upper end portion 36 of the funnel has an extreme large diameter approximately equal to the diameter of the interior of the globe so that virtually all of the feed flowing from the storage area 11 into the feeding chamber 30 flows by gravity through the orifice. An inwardly turned flange 37 integrally formed with the lower end of the funnel defines the size of the orifice and helps direct the feed toward the center of the feeding chamber 30.

Figure 4:
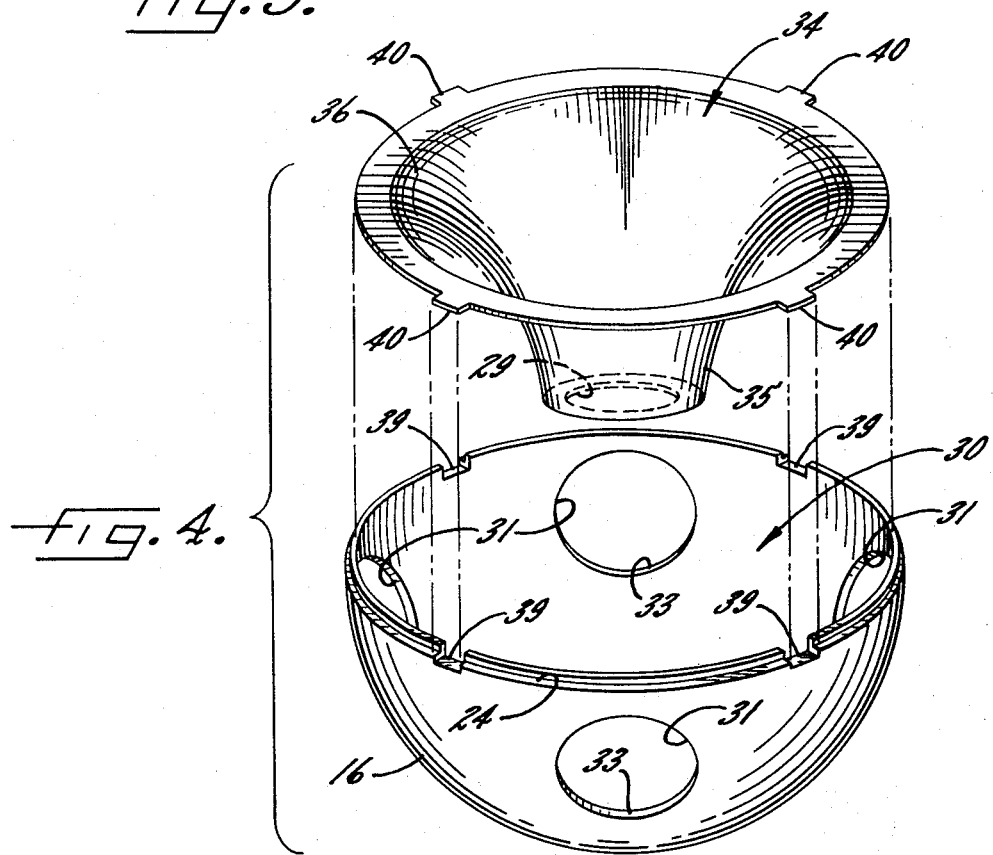
FIG. 4 is an exploded perspective view of parts of the feeder.

As shown in FIGS. 3 and 4, the funnel 34 is supported upwardly within the chamber 30 with the orifice 29 located a predetermined distance above the bottom of the chamber so that the feed 13 may flow by gravity freely from the storage area 11 and into the chamber. More particularly, the upper edge 24 of the lower section 13 supports the funnel upwardly within the chamber and includes four notches 39 formed at angularly spaced positions around the edge. Four corresponding radial tabs 40 project outwardly from the extreme upper end portion 36 of the funnel and are received within the notches so that, with the upper hemispherical section 15 clamped together with the lower section 16, the funnel is captivated within the globe with the rod 17 extending axially through both the globe and the orifice 29 (see FIGS. 2 and 3).

Advantageously, the lower hemispherical 16 is constructed with four of the ports 31 which, while allowing the clinging type birds such as finches and the like to eat from the feeder, serves as the means for virtually preventing other types of birds from perching on the feeder and eating the feed contained within the chamber. To these ends, the ports are circular in shape having diameters of around 1 ⅝ inches and are spaced angularly from each other with their bottom edges located approximately two inches below the upper edge 24 of the lower hemispherical section 16. In these positions, with the globe 10 being about 6 inches in diameter and the orifice 29 positioned about 1 inch above the bottom of the chamber 30, the bottom edges 33 of the ports are located generally level with the orifice 29 so that the bottom edges and the orifice are in generally the same horizontal plane. It has been found that with this construction, the orifice and ports are positioned relative to each other whereby the clinging type birds can hang from the edges and still reach the feed within the chamber 30 while other types of birds virtually are prevented from perching on the feeder to reach the feed in the chamber.

I claim as my invention:

1. A feeder for clinging birds including an enclosed reservoir, a lower chamber within the lower portion of said reservoir, an upper storage area for bird feed within the upper portion of said reservoir, a partition mounted within said reservoir and separating said storage area from the chamber, an orifice extending through said partition and communicating between said storage area and the chamber, said orifice being positioned above the bottom of said chamber a predetermined distance whereby feed in the storage area flows by gravity into said chamber, and means including a plurality of angularly spaced ports extending through the side wall portions of said reservoir in communication with said chamber whereby only the clinging type birds may grasp the edges of said ports and reach into the chamber to obtain feed, said ports being positioned between said orifice and said upper storage area whereby feed flowing through said orifice into the chamber avoids spilling out through the ports while still filling the chamber to a level which the clinging birds can reach.

2. A feeder for clinging birds including a hollow globe having an upper hemispherical section and a lower hemispherical section, means holding said two sections together in abutting edge to edge relationship, a funnel mounted within said globe and dividing the interior thereof into an upper storage area and a lower feed chamber, said funnel having a lower end portion extending downwardly into said lower section to terminate above the bottom of said section whereby feed flows by gravity from said storage area into said chamber, a plurality of ports angularly spaced from each other and extending through said lower section to communicate with said chamber, said ports having bottom edges positioned vertically with respect to the lower end of said funnel whereby feed flowing through the funnel avoids spilling out through the ports while still filling the chamber to a level which the birds may reach by clinging on the edges of said ports.

3. A feeder as defined by claim 2 wherein said funnel is frustoconical in shape and includes an upper end portion having a diameter generally equal to the interior diameter of said globe, a plurality of generally radial tabs projecting outwardly from the edge of said upper end portion at positions angularly spaced from each other, said tabs extending between the edges of said hemispherical sections and each being positioned within a notch formed in at least one of said edges thereby to support said funnel within the interior of said globe.

4. A feeder as defined by claim 3 including four of said ports with the lower edges thereof level with the lower end of said funnel.

5. A feeder as defined by claim 4 including an inwardly turned annular flange integrally formed with the lower end of said funnel to help direct the flow of feed from said storage area into the center of said chamber.

6. A feeder as defined by claim 5 wherein said holding means includes an elongated rod extending through aligned axial openings in said upper and lower sections, a nut threaded on each of the opposite end portions of said rod in engagement with said sections to hold the sections together.

7. A feeder for clinging birds including a hollow globe of predetermined diameter having upper and lower hemispherical sections, a lower edge formed on said upper section, an upper edge formed on said lower section and facing said lower edge, an elongated rod telescoped axially through both of said hemispherical sections and having opposite end portions projecting through axially aligned holes in said sections, upper and lower nuts threaded on said opposite end portions and engaging said upper and lower hemispherical sections to hold said sections together in abutting edge to edge relationship, a funnel mounted within said globe and dividing the interior of said globe into an upper storage area and a lower feeding chamber, said funnel having an inverted frustoconical shape with a lower end portion having an orifice axially aligned with the holes in said sections and spaced above the bottom of said lower section to direct feed from the storage area into said chamber, a large diameter upper end portion approximately equal to the diameter of the interior of said globe to support feed upwardly within said storage area and a plurality of generally radial tabs integrally formed with the peripheral edge of said upper end portion and projecting outwardly therefrom at positions angularly spaced from each other, said tabs overlapping the upper edge of said lower section to support said funnel upwardly within said globe, an opening extending through said upper section for pouring feed into the storage area, and a plurality of ports formed through the side of said lower section at angularly spaced positions from each other to communicate with said chamber, said ports having bottom edges horizontally disposed adjacent the level of said orifice whereby feed flowing through said funnel into the chamber avoids spilling out through the ports while still filling the chamber to a level which can be reached by the birds when clinging to the edges of said ports.

* * * * *